Nov. 1, 1938.   R. O. GRIFFIN   2,134,715
SELECTIVE FILING AND FINDING SYSTEM
Filed Oct. 9, 1935.   7 Sheets-Sheet 1
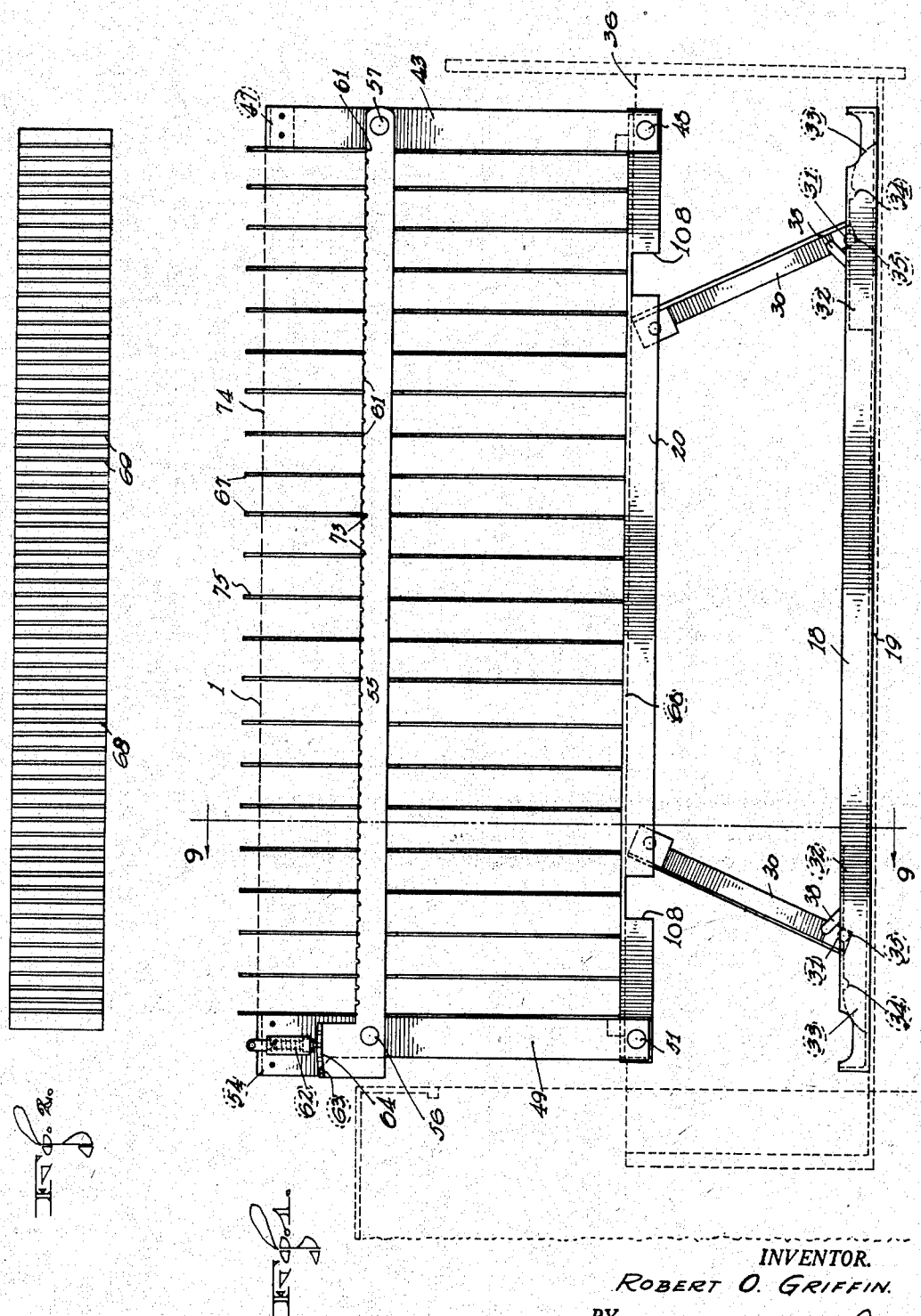
INVENTOR.
ROBERT O. GRIFFIN.
BY Munn, Anderson & Liddy,
ATTORNEYS.

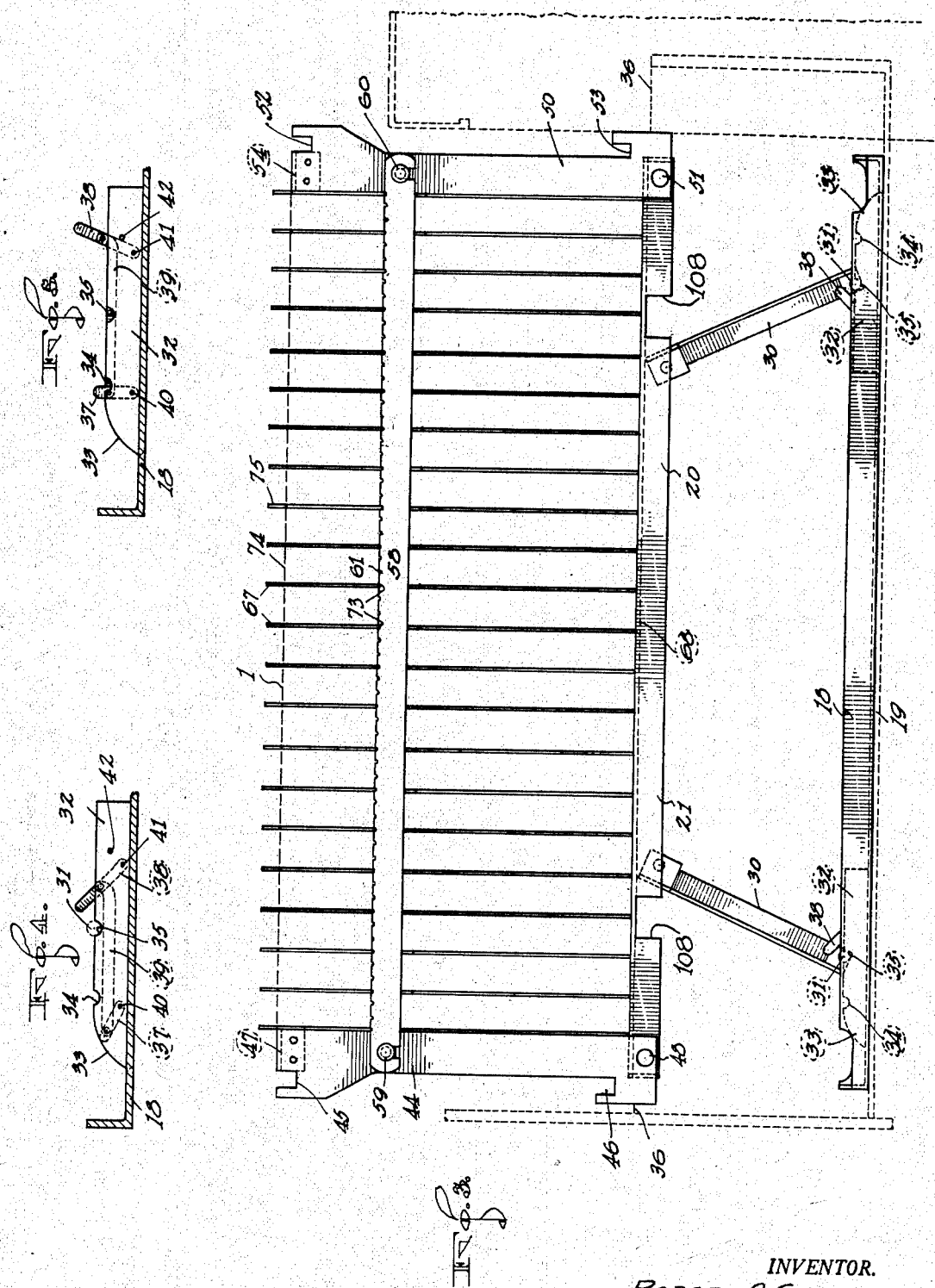

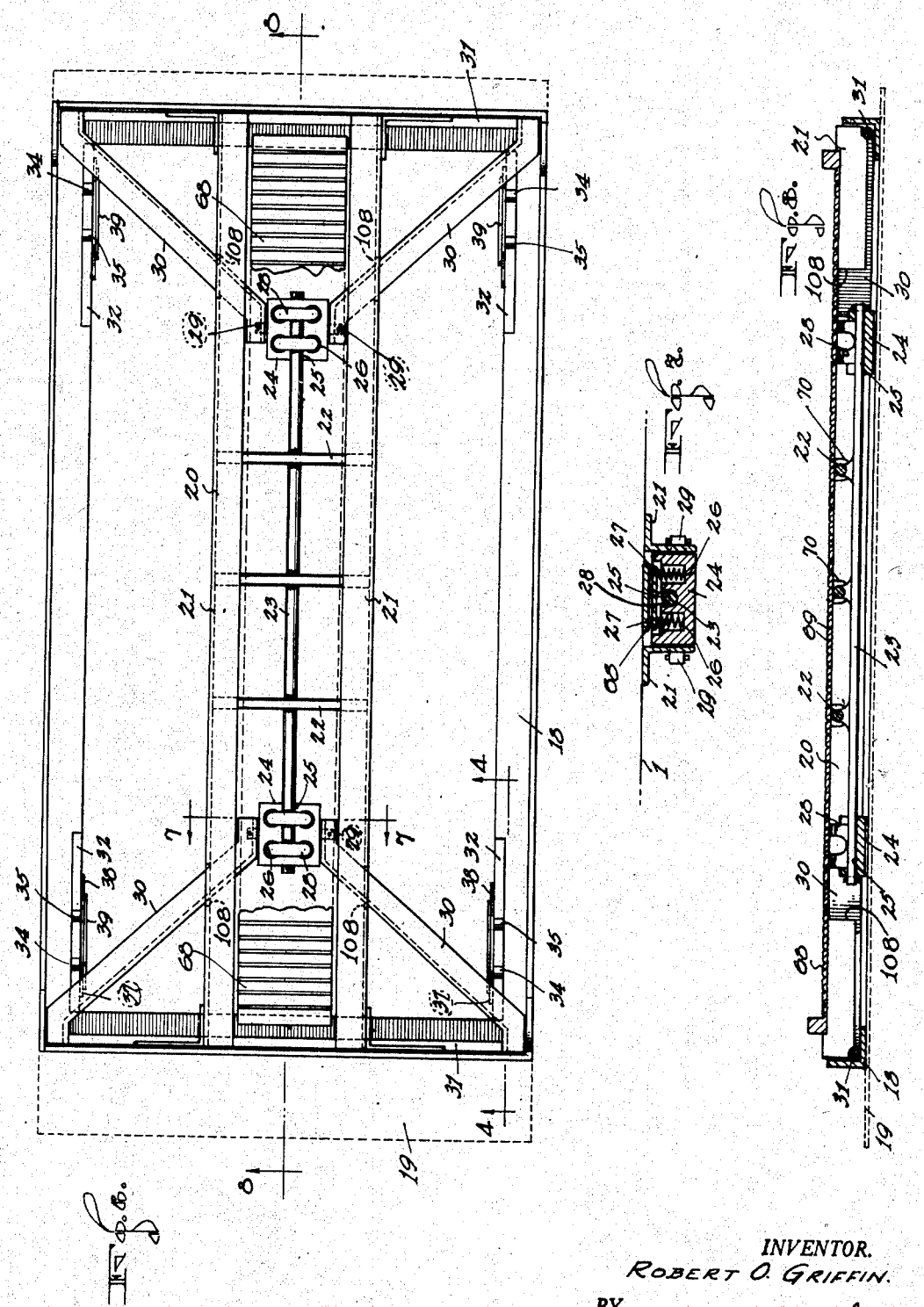

Nov. 1, 1938.  R. O. GRIFFIN  2,134,715
SELECTIVE FILING AND FINDING SYSTEM
Filed Oct. 9, 1935  7 Sheets-Sheet 4
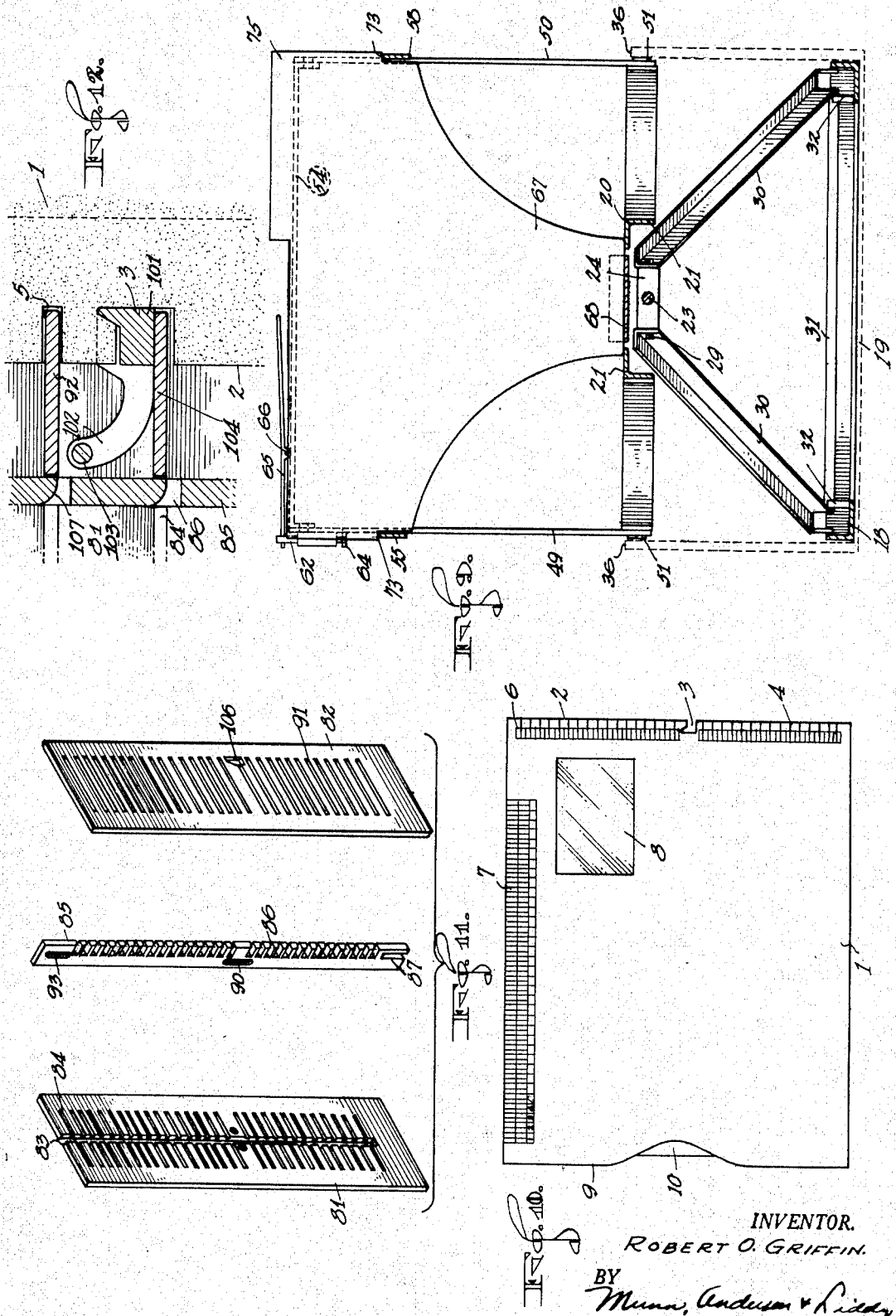
INVENTOR.
ROBERT O. GRIFFIN.
BY
ATTORNEYS.

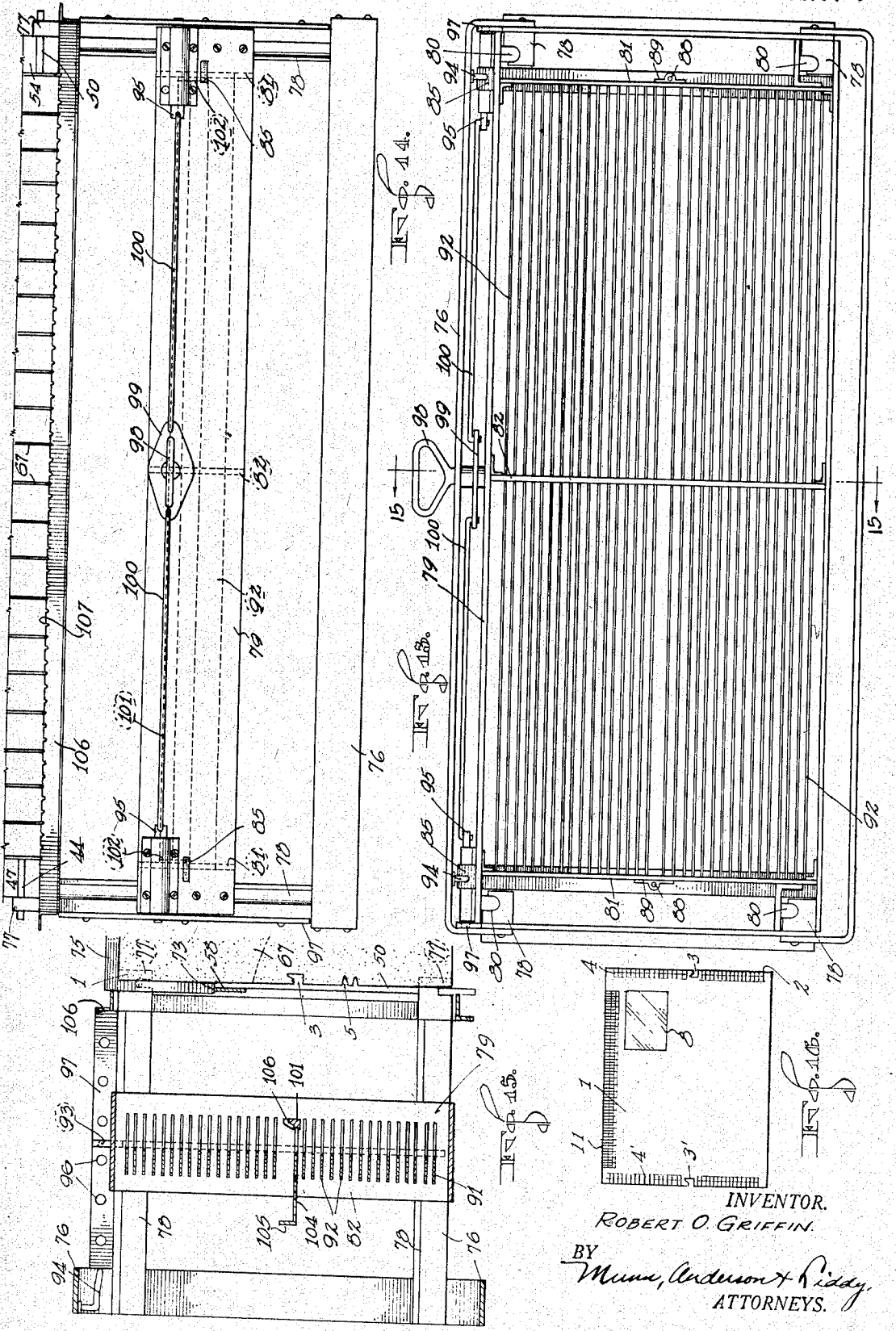

Nov. 1, 1938.   R. O. GRIFFIN   2,134,715
SELECTIVE FILING AND FINDING SYSTEM
Filed Oct. 9, 1935   7 Sheets-Sheet 6
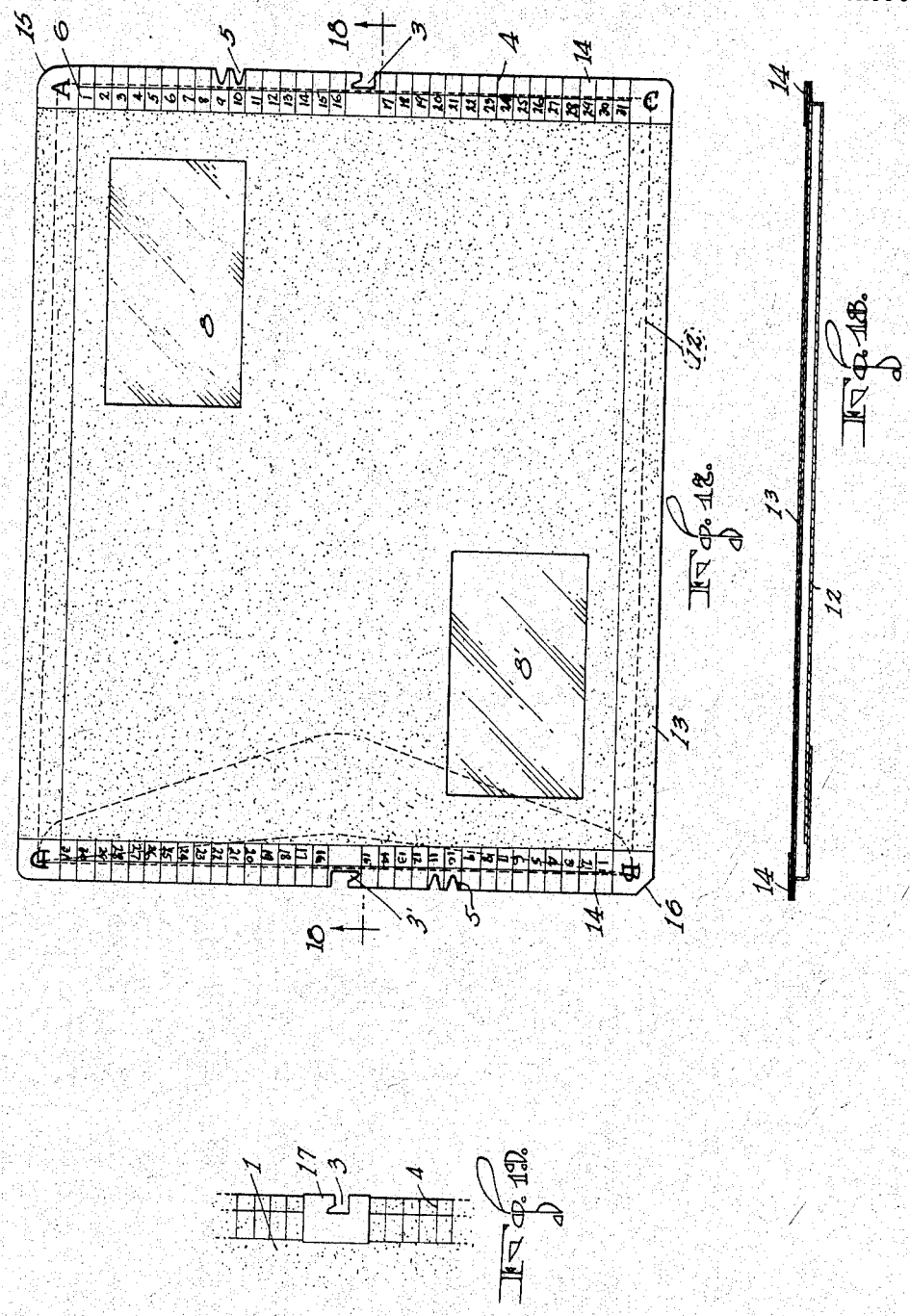
INVENTOR
ROBERT O. GRIFFIN
BY Munn, Anderson & Riddy
ATTORNEYS.

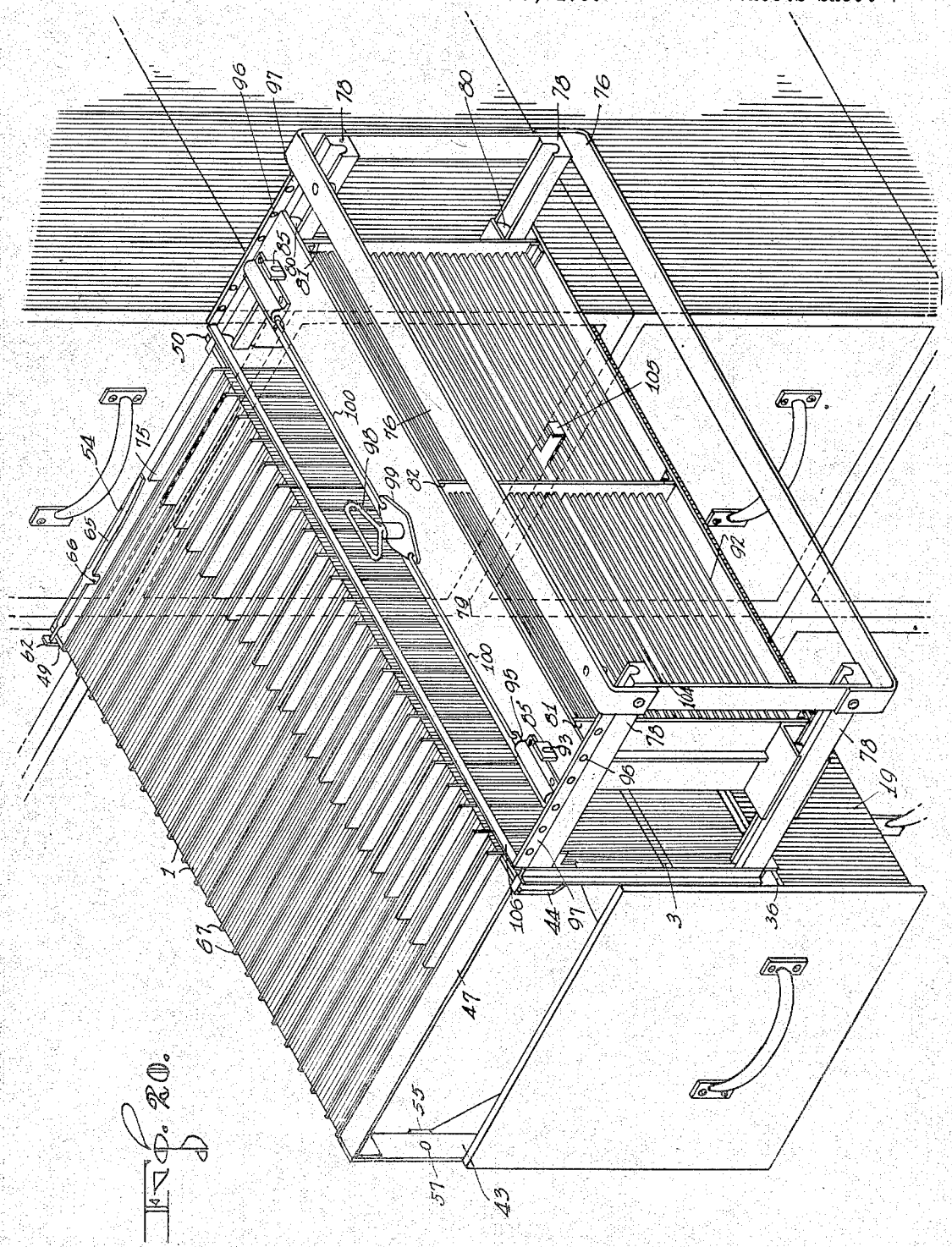

Patented Nov. 1, 1938

2,134,715

UNITED STATES PATENT OFFICE 2,134,715

SELECTIVE FILING AND FINDING SYSTEM

Robert O. Griffin, Berkeley, Calif.

Application October 9, 1935, Serial No. 44,285

20 Claims. (Cl. 129—16.1)

My invention relates to improvements in selective filing and finding systems, and it consists of the combinations, constructions and arrangements hereinafter described and claimed.

In the standard filing systems it is difficult to quickly locate all files pertaining to a given subject. I have special reference to files of criminal records where it is desired to obtain at one time, for example, all files pertaining to the crime of burglary, while at another time it is desired to obtain all files pertaining to the crime of murder. It might be that one criminal has a record of both crimes, and with the usual systems a cross reference is made so that the criminal's file will be located for the two crimes mentioned. It will be seen that if further cross reference is desired such as, for example, the color of the criminal, the sex of the criminal, his previous penal servitude, any identifying marks, his age, height, etc., a bewildering number of cross references would be resorted to, and the larger the contents of the file, the more time it would take to locate the desired files.

The principal object of the present invention is to provide a filing system in which one file is provided for each criminal, and then this file is coded in a predetermined manner to indicate the various offenses and other data pertaining to the criminal. The coding is accomplished by forming recesses in one or more edges of the file, and I then make use of a selector hereinafter described for removing all files carrying a code corresponding to the data desired. In the present invention I have adapted the entire device to the standard filing cabinet and therefore this cabinet may be used with the device without any alterations being necessary. The invention is so designed that it can be placed within the cabinet drawer, and will function to select the desired files from all of the files within the drawer, this selection being accomplished quickly.

With the present device the files carrying a code corresponding to the desired data are initially moved laterally from the other files. All of the files are provided with windows carrying identification features such as the front and side views of the face of the criminal, his finger prints, etc. It is possible for the operator to quickly go through the files partially removed from the remaining files without entirely removing the selected files from the drawer. On the other hand it is possible to remove the selected files and go carefully through the data contained in each file.

Although the device has been described as expressly adapted for criminal records, it is obvious that it can be used for other purposes, such as employment records, etc. The device is durable and efficient for the purpose intended, and mechanically locates the desired files. In this way all of the files pertaining to a given subject can be quickly separated from the remaining files.

Other objects and advantages will appear in the following specification, and the novel features of the device will be particularly pointed out in the appended claims.

My invention is illustrated in the accompanying drawings forming a part of this application, in which—

Figure 1 is a side elevation of the file supporting device showing it in raised position in the drawer;

Figure 2 is a plan view of a portion of the device;

Figure 3 is a view similar to Figure 1, but taken from the opposite side of the file supporting device;

Figure 4 is a section along line 4—4 of Figure 6;

Figure 5 is a view similar to Figure 4 showing the parts in different position;

Figure 6 is a plan view of the file supporting device;

Figure 7 is a section along the line 7—7 of Figure 6;

Figure 8 is a section along the line 8—8 of Figure 6;

Figure 9 is a section along the line 9—9 of Figure 1;

Figure 10 is a front elevation of an envelope file;

Figure 11 shows perspective views of parts of the selector;

Figure 12 shows a diagrammatic sectional view of the selector and its relation with the envelope file;

Figure 13 is a side elevation of the selector;

Figure 14 is a top plan view of Figure 13;

Figure 15 is a section along the line 15—15 of Figure 13;

Figure 16 is a front elevation of a modified form of envelope file;

Figure 17 is a front elevation of another modified form of envelope file;

Figure 18 is a section along the line 18—18 of Figure 17;

Figure 19 is a fragmentary view of still another modified form of envelope file; and Figure 20 is a perspective view showing my file supporting device and selector as operatively applied to the drawer of a conventional filing cabinet, the drawer being illustrated in opened position.

In carrying out my invention I will first describe the envelope file, and then will set forth the file supporting device, and finally will describe the file selector.

Envelope file

The envelope is constructed in a novel manner so as to cooperate with the file selector. In Figure 10 I show one form of the envelope which is indicated at 1. The envelope has a reinforced edge 2 provided with a hook-shaped notch 3 and with markings 4 that may be punched out to provide recesses 5 of the type shown in Figure 17. The markings 4 are disposed opposite a column 6 and this column may be provided with numbers as indicated in a similar column 6 in the envelope shown in Figure 17. If desired, the top of the envelope may carry a scale or row of squares 7 in which other designating data may be placed. The front face of the envelope is provided with a window 8 disposed adjacent to the markings 4 and the envelope shown in Figure 10 is provided with a left-hand opened end 9 and data, such as that indicated at 10, is placed in the envelope.

A slightly modified form of envelope file is shown in Figure 16 where the opening into the envelope is along the upper edge 11. A second row of markings 4' are disposed on the left-hand edge of this envelope and cooperate with the row of markings 4 disposed on the right-hand edge. A notch 3' extends inwardly from the left-hand edge and is similar to the notch 3. This envelope is also provided with a window 8. It is necessary that the edges along the markings 4 or 4' be reinforced in order that the recesses 5 be maintained in the same position throughout the life of the envelope. Any reinforcing member, such as a fiber strip, not shown, may be used.

In Figure 17 I show a still further modification of the envelope file. In this form the envelope 12, see Figure 18, is secured to a stiff rectangular member 13, which may be made out of cardboard, or any other material desired. The right and left-hand edges of the envelope shown in Figure 17 are reinforced by strips of metal 14 which are formed into a channel and enclose the edges. These strips of metal can have the columns of numbers 6 stamped thereon and the notches 3 and the recesses 5 are cut out from these metal strips. Two windows 8 and 8' are provided in this type of envelope, and the envelope may be inverted from the position shown in Figure 17 so that the B column will appear at the right-hand side instead of the A column. This will permit an initial selection of envelopes by the recesses 5 in the column A and then a further selection from the selected group of envelopes by the recesses in the column B. The file is turned prior to the second selection so that the column B will appear at the right-hand side instead of the column A. In order to quickly determine which column A or B is disposed at the right-hand side I have formed a curved corner 15 for the column A, and an angled corner 16 for the column B. The data in the envelope generally contains a picture of the criminal, or finger prints, or both, in case the device is used for criminal records. This identifying data is positioned in the envelope so as to be seen through the window 8 or the window 8'. It is obvious that the columns marked C and D in the envelope shown in Figure 17 may be used. In this event the card 13 would be preferably square in shape so that the card could be swung through 90° to bring any of the desired columns A to D inclusive at the right-hand side of the card.

Although I show the card 13 as being reinforced throughout its entire right and left-hand edges, it is obvious that the channel-shaped member 14 may be dispensed with and the card itself be made sufficiently strong to stand up under usage. It may be desired to merely protect the portion of the card disposed around the notch 3. In Figure 19 I therefore show a small U-shaped metal channel 17 which surrounds the notch 3. This notch is used to withdraw the envelope file in the manner hereinafter described, and therefore the device will last longer if reinforced in the manner described.

File supporting device

The file supporting device is shown in Figures 1 to 9 inclusive. In Figure 1 a base 18 is mounted in a file cabinet drawer indicated generally at 19, and Figure 6 shows the base 18 as substantially filling the drawer. The width of the base is equal to the width of the drawer and there is a slight space left between the front and rear ends of the base and the front and rear ends of the drawer. The base is rectangular in shape and is preferably formed from angle irons.

A file supporting frame 20 is shown in Figures 1, 3, 6 and 9, and this frame consists of two longitudinally extending angle irons 21 held in spaced and parallel relation by connecting rods 22. Figure 8 shows the rods 22 as being welded or otherwise secured to a longitudinally extending rod 23. The ends of the rod 23 are rotatably received in supporting blocks 24. Since both blocks are identical a description of one will suffice.

In Figure 7 I show the block 24 provided with a groove 25 for rotatably receiving the end of the rod 23. On each side of the groove 25 I provide two bores 26 and in these bores I mount coiled springs 27. Cross pieces 28 are welded to the rod, and these bear on the coiled springs 27.

Each block 24 carries two trunnions 29, and these trunnions pivotally receive legs 30. Figure 6 shows the legs 30 as extending outwardly at an angle, and as having their free ends connected together by a transverse rod 31.

When the frame 20 is lifted by a means hereinafter described the legs 30 will swing through an arc due to gravity and the rods 31 of each pair of legs will be moved toward each other. However, if only one end of the frame 20 is raised only the legs at this end will move with respect to the base 18.

In Figures 4 and 5 I illustrate novel means for holding the rod 31 against return movement when the frame 20 is lifted, and therefore the frame will be supported in raised position. On the inner edges of the side angle irons of the base I mount cam tracks 32 of the shape shown in Figures 4 and 5. These tracks have an inclined portion 33 and two recesses 34 and 35. When the rear end of the frame 20, for example, is raised the transverse rod 31 will be moved to the right in Figure 4, and will travel up over the curved portion 33, and then drop into the first recess 34. The frame 20 can then be released and the rod 31 will hold the frame in inclined position. The frame in this position will facilitate the removing or filing of the envelope files in the manner which will be more clearly described hereinafter. If the operator wishes to raise the frame 20 to a still higher angle the rear of the frame is again lifted, and this will cause the transverse rod 31 to move out of the recesses 7

34 and into the recesses 35. If the front end of the frame 20 is raised in the same manner, the front transverse rod 31 will be moved into the recesses 35. This will support the frame 20 at an elevation shown in Figures 1 and 3. The frame in this position is slightly higher than the upper edge of the side walls 36 of the cabinet drawer 19.

As a means for quickly freeing the rods 31 from operative engagement with the cam tracks 32 I provide the two arms 37 and 38, and the link 39 shown in Figures 4 and 5. The arms 37 and 38 are pivoted at 40 and 41 to the cam track 32 and normally dispose the link 39 below the upper edge of the cam track 32. When the operator desires to lower the frame 20 down into the position shown in Figure 8 he initially raises the frame 20 still higher, and this will cause the transverse rods 31 to move out of the recesses 35 and to contact with the portion of the arm 38 projecting above the top of the cam track 32. Further upward movement of the frame 20 will cause the rods 31 to swing the arms 38 into the position shown in Figure 5. A pin 42 prevents further movement of the arm 38 in the same direction. The movement of the arm 38 will swing the arm 37 so that a portion projects above the top of the track 32 and will also lift the link 39 into a position to cover the recesses 34 and 35. When now the frame 20 is lowered the rods 31 will be moved clear of the recesses 34 and 35 by the links 39. As the rods 31 pass the recesses 34 they will strike the arms 37, and will swing the release mechanism back into the position shown in Figure 4. The mechanism will now be ready for the next operation.

It will be noted that the frame 20 is mounted on springs 27 and that the arrangement is such that a rocking motion can be imparted to the frame 20 along its longitudinal axis for a purpose hereinafter described.

At the front of the frame 20 I mount two uprights 43 and 44, and the upright 44 is provided with recesses 45 and 46 for a purpose hereinafter described. A cross strip 47 connects the tops of the uprights 43 and 44 together. The uprights are pivoted at 48 to the frame 20.

In like manner the rear of the frame 20 is provided with uprights 49 and 50, and these are pivoted to the frame at 51. The upright 50 is provided with recesses 52 and 53 which correspond to the recesses 45 and 46. A bail or cross piece 54 connects the upper ends of the uprights 49 and 50 together. Figure 1 shows a longitudinally extending bar 55 pivotally connected at 56 and 57 to the uprights 49 and 43 respectively. Figure 3 shows a removable bar 58 pivotally and removably connected to the uprights 44 and 50 by pins 59 and 60. The upper edges of the bars 55 and 58 are notched as at 61.

It is desirous to keep the uprights 43, 44 and 49 and 50 in a vertical position even though the frame 20 may extend at an angle with respect to the base 18. Furthermore, it is desirous to hold the uprights in rigid position with respect to the base. To accomplish this I provide a spring-pressed plunger 62 on the upright 49, see Figure 1, and this plunger is receivable in openings 63 in an arcuate member 64 formed as an integral part of the bar 55. In Figure 9 I show the top of the spring-pressed plunger 62 as being operatively connected to a lever 65, and this lever is pivoted at 66 to the cross strip or bail 54. When the operator wishes to raise only the rear end of the frame 20, he not only grasps the bail 54, but at the same time presses the lever 65. This will free the plunger 62 from one of the openings 63 and will permit the uprights 49 and 50 to be lifted in a vertical position, while the frame 20 is being swung into an inclined position. When the transverse rod 31 reaches either of the recesses 34 or 35, the spring-pressed plunger 62 may be freed and will enter one of the openings 63 and lock the uprights in vertical position. When the free end of the frame 20 is raised the spring-pressed plunger will be released long enough to permit the frame to be brought into a parallel relation with the base 18.

Difficulty is experienced in supporting the files in vertical position. To overcome this difficulty I provide a plurality of partitions or separators 67, and the shape of these partitions is shown in Figure 9. The bottoms of the partitions are reduced in width, and rest upon a central supporting strip 68, see Figure 2. This strip is provided with transverse grooves 69, and the strip is secured to the frame 20 by eyelets 70 through which the rods 22 pass, see Figure 8. The grooves 69 correspond with the notches 61, and therefore the bottoms of the partitions 67 are not only received in the grooves 69 but shoulder portions 73 of the partitions, see Figure 9, are received in the notches 61 of the bars 55 and 58. The grooves and the notches will hold the partitions or separators in vertical position and the partitions in turn will hold the files in vertical position, irrespective of the angle of the frame 20. The height of the envelope files is indicated by the dotted lines 74 in Figure 1. The partitions 67 have a portion 75, see Figure 9 that projects above the files, and on this portion any data desired may be printed, such as numbers to aid in filing.

The envelope files when placed in the frame 20 are disposed so that the marked edges 4 are adjacent to the removable bar 58. It will be seen from the construction thus far described that the file supporting frame can be used in a standard filing cabinet to raise the group of files into an inclined position by inclining the frame 20. This will raise the partitions 67 in such a manner that the tabs 75 will be readable without moving the files. Also the adding of files or the removing of files from the device will be facilitated when the frame 20 is in inclined position. The purpose of raising the frame 20 into a horizontal position at a point above the upper edges of the drawer sides is to permit the movement of the files over the top of the drawer side when these files correspond in code with the data desired. It is best now to describe the file selector and its relation to the file supporting device.

*File selector*

The file selector is shown in Figures 11 to 15 inclusive, and in Figure 20. It includes a frame indicated generally at 76. This frame is equal in length to the length of the frame 20, and is provided with four hooks 77, see Figures 14 and 15, that are designed to be removably received in the recesses 45, 46, 52 and 53. When the hooks 77 are placed in the recesses the selector frame 76 will be rigidly secured to the file supporting frame 20. Figures 13 and 20 show the frame 76 provided with transverse guides 78. These guides slidably support a carriage 79. The carriage is provided with rails 80 that slide in the guides 78.

Figure 15 shows the carriage 79 disposed midway between the sides of the frame 76. Figure 13 shows the carriage provided with end plates 81 and a central plate 82. Since both end plates 81 are identical a description of one will suffice. In Figure 11 I show the end plate 81 as being provided with a vertical central slot 83, and with transverse grooves 84 on its inner surface, these grooves extending beyond both sides of the slot 83. A stop bar 85 also shown in perspective in Figure 11 is slidably mounted in the slot, and carries slots 86 equal in number to the grooves 84. The lower end of the bar 85 is slotted at 87, and this slot receives a portion of the end plate 81 disposed immediately below the bottom of the slot 83. The stop bar 85 is normally in a position where the inner end of the slot 87 contacts with the lower end of the slot 83. When the bar is in this position the slots 86 are out of registration with the grooves 84. See Fig. 12.

Referring again to Figure 13 it will be seen that the stop bar 85 is not only held in vertical position by the slot 87 but is also held in place by a pin 88 secured by brackets 89 to the outer surface of the end plate 81, this pin being slidably received in an elongated slot 90 in the stop bar 85, see Figure 11. Two stop bars 85 are provided, and they are secured to the end plates 81 in the manner described.

The central plate 82 has slots 91 equal in number to the grooves 84 in the end plates 81. Figure 15 shows selector strips 92 slidably disposed in the grooves 84 of the end plates and in the slot 91 of the central plate. When the carriage 79 is in the position shown in Figure 15 the stop bars 85 will be in their lowermost positions and the selector strips 92 will be held in inoperative position, i. e., in a position at the left-hand ends of the slots 91 when looking at Figure 15. Figure 11 shows the top of the stop bar 85 provided with a slot 93 and Figure 15 illustrates a cam pin 94 carried by the frame 76 which is designed to enter the slot 93 when the carriage 79 is moved to its extreme left-hand position. The cam pin 94 will raise the stop 85 by contacting with the upper edge of the slot 93. The raising of the stop bar is just sufficient to bring the slots 86 into registration with the grooves 84. Both stop bars 85 are simultaneously raised in this manner.

The selector strips 92 are now free to be moved from the left-hand side of the carriage 79, when looking at Figure 15, to the right-hand side. A code has been worked out previously so that certain selector strips 92 will stand for envelope files containing certain data. These envelope files will have been provided with recesses 5 corresponding in position to the position of the selector strip 92. Suppose, for example, that the envelope file has been provided with recesses at the numbered places 9 and 10, as shown in Figure 17. These two numbered places may stand for a certain crime. If the operator wishes to remove all envelope files containing data pertaining to this crime he merely moves the ninth and tenth selector strips 92 from the left-hand side of the carriage 79 to the right-hand side. The carriage is now moved from its position at the left-hand end of the frame 76 to the right-hand end of the frame.

This movement is accomplished by first retracting bolts 95, see Figures 13 and 14, from openings 96 in members 97 of the frame 76. The bolts are retracted by turning a handle 98 that is connected to the bolts by a lever 99 and links 100. The carriage can be moved by moving the handle 98 transversely to the frame 76. The movement is continued until the edges of the selector strips 92 that have been moved from the left-hand side of the carriage 79 to the right-hand side, come into contact with the edges of the envelope files 1. The removable bar 58 is now freed from the pins 59 and 60. The handle 98 is now moved up and down, and carries with it carriage 79 and the frame 76. This movement is in the nature of a rocking motion, and the rocking motion will be imparted to the file supporting frame 20. The coiled springs 27 will permit the frame 20 to rock on the supporting blocks 24.

This rocking motion will cause the selected files to fall or move downwardly and outwardly by gravity. The files will be prevented from moving toward the left in Figure 20 by the stationary bar 55. All of the files will also be prevented from moving toward the selector by the two strips 92 that have been moved into operative position excepting those files that carry recesses 5 corresponding in position to the position of the selector strips. Only these files will be moved laterally with respect to the remaining files into a position where the recesses 5 will receive the selector strips. The partitions 67 permit the ready moving of the envelope files and a comparatively short rocking motion will move in the frame 20 all of the files desired.

It is now possible for the operator to check these files that have been moved away slightly from the remaining files without withdrawing them entirely from the drawer. On the other hand, if the operator wishes to withdraw the files still further, he makes use of a means now to be described which will enter the notch 3 of each selected file and remove it.

In Figure 12 I not only show a selector strip 92 that has been moved into operative position, but further show a hook-shaped member 101 that extends throughout the length of the carriage 79, and has its ends supported by cam members 102 which in turn are pivoted at 103 to the end plates 81. A strip 104 similar to the selector strips 92 can be moved from the left-hand side of the carriage 79 as shown in Figure 15, to the right-hand side as shown in Figure 12. The strip is moved by a handle 105 which is integral therewith, and the strip in moving will lift the cams 102 and with it the hook-shaped member 101, vertically. The hook-shaped member 101 has previously entered the notch 3 in the envelope file 1, when the file has moved for causing the recess 5 to receive the selector strip 92. The vertical lifting of the hook-shaped member 101 will now connect the file 1 to the carriage 79. It will be noted from Figures 11 and 15 that the hook-shaped member 101 passes through a recess 106 in the central plate 82. It will also be noted that the strip 104 can be moved to the right in Figures 12 and 15, even though the stop bars 85 are in lowered position because the upper sides of the slots 86 in the stop bar are rounded as at 107.

As the strip 104 is pushed to the right in Figure 12, the stop bars 85 are temporarily raised, due to the strip 104 bearing against the rounded sections 107 on the stop bars. When the strip 104 has been moved to the position shown in Figure 12, the stop bars automatically drop into their lowermost positions.

It will be noted that the selector strips 92 cannot be moved to the right in Figure 12 when the slots 86 in the stop bars 85 are out of registry with the grooves 84, unless the selector strips are manually forced past the stop bars. In actual operation the rounded portions 107 facilitate the passage of the selector strips past the stop bars and toward the right in Figure 12. Return movement of the selector strips is prevented unless the slots 86 are in registry with the grooves 84.

The carriage 79 can now be moved to the left by means of the handle 98 and will withdraw all of the envelopes containing recesses disposed in the same positions as the selector strips 92. It will be seen from this that the files are located mechanically and the time for locating the files is reduced to a minimum. Furthermore, the device is absolutely accurate and will remove all files containing recesses corresponding to the selector strips 92 that are disposed in operative position.

If desired the carriage 79 may be moved to a position where the selected files will expose the windows 8. The operator can quickly check the data in the windows, and can determine whether to entirely remove the files. If he desires to entirely remove the files the carriage 79 can be moved to its extreme left-hand position, and this will raise the stop bars 85 and permit the strip 104 to be moved back into inoperative position. The hook-shaped member 101 will drop by gravity and will permit the files to be removed. It will be seen that all cross-referencing of the different files can be accomplished by this system, and that even though a criminal may have a record of different crimes in the one envelope, it can be recessed to disclose these different crimes so that the envelope will be selected for each of the different crimes. If the combinations in the column A, for example, in Figure 17, are not sufficient the column B can be used. This can also be extended to columns C and D if desired.

While I have shown only the preferred forms of my invention, it should be understood that various changes or modifications may be made within the scope of the appended claims without departing from the spirit of the invention.

The file selector frame 76 has a longitudinally extending angle iron 106 that is designed to contact with the side edges of the partitions 67 and hold them in position when the bar 58 is removed. The edge of the angle iron 106 contacting with the partition edges is notched at 107 for receiving the edges. See Figure 14. These notches agree in number with the notches 73 in the bar 55 and the grooves 69 in the plate 68. The partitions 67 will therefore be held against lateral and longitudinal displacement during the rocking motion.

Figures 1 and 6 show recesses 108 in the frame 20 for receiving the legs 30 when the frame is in the position shown in Figure 8. Blocks, not shown, may be disposed between the ends of the drawer and the ends of the base 18 to hold the base against movement. It is obvious that the partitions 67 can be supported in substantially vertical position by some means other than the notches 73 in the bars 55 and 58 and the grooves 69 in the plate 68.

I claim:

1. In a filing system, a receptacle for files provided with a bottom file supporting member and side file retaining members, said bottom and side members being notched, partitions adjustably carried by the bottom and side members and being yieldingly held in adjusted position by the notches, said partitions having portions extending above the tops of the files, said partitions being movable to accommodate themselves to the files disposed therebetween, one of the side members of the receptacle being removable, and means arranged to temporarily engage with said partition portions to retain the partitions in position when the side member is removed, whereby the files may be withdrawn laterally from the receptacle and beneath said means.

2. In a filing system, a base, a file supporting frame, legs pivoted to the frame, means carried by the base and cooperating with the legs for holding the frame in a raised position with respect to the base when the frame is lifted, and means for freeing said first-named means from the legs when the frame is lifted still higher, whereby the frame can again be lowered down upon the base.

3. In combination, a base, a file supporting frame, legs pivotally connected to the frame, means carried by the base and cooperating with the legs for supporting the frame in angular or parallel positions with respect to the base, end file-supporting members pivoted to the frame, and means for holding the end members in a vertical position irrespective of the position of the frame.

4. The combination with a plurality of files provided with recesses in one of their marginal edges arranged in a predetermined manner, of a selector adapted to be placed adjacent to the recessed edges of the files, selecting means carried by the selector and adapted to be brought into contact with the recessed edges when the files are urged toward the selector, whereby those files whose recesses register with the selecting means will move with respect to the remaining files, and means carried by the selector for removing the files thus initially moved.

5. The combination with a filing drawer having sides, of a plurality of files provided with recesses in their sides arranged in a predetermined manner, file supporting means disposed in the drawer for elevating the files above the drawer sides, a file selector removably secured to the file supporting means and including selector members designed to enter registering recesses in the file edges when the files are urged toward the selector, the files whose recesses do register with the members moving over the drawer side while the files whose recesses do not register with the selector are held against movement, whereby a selection is made of the desired files from the rest of the files.

6. The combination with a filing drawer having sides, of a plurality of files provided with recesses in their sides arranged in a predetermined manner, file supporting means disposed in the drawer for elevating the files above the drawer sides, a file selector removably secured to the file supporting means and including selector members designed to enter registering recesses in the file edges when the files are urged toward the selector, the files whose recesses do register with the members moving over the drawer side while the files whose recesses do not register with the selector are held against movement, whereby a selection is made of the desired files from the rest of the files, and means carried by the selector for withdrawing all of the files that have been initially moved with respect to the remaining files.

7. In combination, a base, a file supporting frame, legs adapted to support the frame above the base and resting on the base, means interposed between the frame and the legs for permitting the frame to be rocked about its longitudinal axis, a selector removably secured to the frame, files carried by the frame and being provided with recesses along their edges disposed adjacent to the selector, said recesses being arranged in a predetermined manner, adjustable selector members carried by the selector, said frame when rocked causing files whose recesses register with the members, to move so that the recesses will receive the members, and means carried by the selector for entirely removing the files thus initially moved.

8. In combination, a plurality of files provided with recesses along an edge arranged in a predetermined manner, each file also having a window disposed close to the recessed edge, a frame for supporting the files, a selector attached to the frame adjacent to the recessed edges of the files, adjustable selector members carried by the selector and designed to be received in the recesses when the files are urged toward the selector, whereby those files provided with recesses registering with the selectors will be moved with respect to the remaining files, and means for moving the files selected with respect to the remaining files for exposing the windows.

9. An automatic release mechanism for a track having a plurality of recesses therein, comprising two arms disposed at the ends of the row of recesses, one of the arms projecting above the track, a link connected to the arms and normally being disposed below the recesses, said link being raised into operative position when the arm projecting above the track is swung, this movement raising the other arm to project above the track.

10. In combination, a plurality of files provided with recesses disposed along an edge and arranged in a predetermined manner, all of the files being provided with a hook-shaped notch in the same edge, a file selector, selecting members movable into a position in the selector to enter recesses in the files corresponding to the position of the members, whereby when the files are moved toward the selector, certain files will move out of registration with all of the other files, and a hook-shaped catch carried by the selector, said catch being movable into the hook-shaped notches of the files already partially removed for entirely removing the files.

11. A file selector comprising a frame, a carriage movable in the frame, selector strips mounted in the carriage and being adjustable from inoperative position into operative position, and stops for holding the strips either in inoperative position or operative position, and means for moving said stops into released position when the carriage is moved to a predetermined position, whereby the strips can be moved from operative to inoperative position or vice versa.

12. A file selector comprising a frame, a carriage movably carried by the frame, selector strips slidably carried by the carriage from inoperative position into operative position, a file remover carried by the carriage, and manually controlled means for moving the file remover from inoperative position into operative position.

13. In a filing system, a base, a file supporting frame adapted to be manually lifted with respect to the base, means connecting the frame with the base for holding the frame in a raised position, and means for freeing said means when the frame is lifted still higher, whereby the frame can again be lowered down upon the base.

14. In combination, a track having a plurality of recesses therein, a member movable along the track and into the recesses, a pair of arms disposed at the ends of the row of recesses, one of the arms projecting above the track, a link connected to the arms and normally being disposed below the recesses, said link being raised into operative position to bridge across the recesses when the arm projecting above the track is moved by said member, this movement raising the other arm to project above the track to be lowered upon return movement of said member along the track.

15. In combination, a plurality of files provided with recesses disposed along an edge thereof and arranged in a predetermined manner, the files being provided with notched portions in the same edge as the recesses, a file selector, selecting members movable into a position in the selector to enter recesses in the files corresponding to the position of the members, whereby when the files are moved toward the selector certain files will move out of registration with the remaining files, and means carried by the selector and movable into the notched portions of the files already partially removed for entirely removing the files upon withdrawal of the selector relative to the files.

16. A file selector comprising a frame, a carriage movably carried by the frame, selector strips slidably carried by the carriage and being movable from inoperative into operative position, a file remover carried by the carriage, and means for moving the file remover from inoperative into operative position to engage with files.

17. In combination, a plurality of files provided with recesses along their edges arranged in a predetermined manner, a rockable support for the files, a file selector disposed along the side of the recessed edges, and adjustable selecting means carried by the selector and designed to enter the recesses that correspond with the particular adjustment of the selecting means, whereby a rocking of the support will cause only those files having recesses corresponding with the adjustment of the selecting means to shift toward the selector and be moved with respect to the remaining files.

18. In combination, a plurality of files provided with recesses along their edges arranged in a predetermined manner, a support for the files, means mounting the file support for rocking movement about a horizontal axis, a file selector disposed along the side of the recessed edges, and adjustable selecting means carried by the selector and designed to enter the recesses that correspond with the particular adjustment of the selecting means, whereby a rocking of the file support about said horizontal axis will cause the files having recesses corresponding with the adjustment of the selecting means to gravitate toward the file selector.

19. In combination, a plurality of files provided with recesses along their edges arranged in a predetermined manner, a file selector disposed along the side of the recessed edges, adjustable selecting means carried by the selector and designed to enter the recesses of the files that correspond with the particular adjustment of the selecting means when the files and selector are urged toward each other, whereby only those files having recesses corresponding with the adjustment of the selecting means will be moved with respect to the remaining files.

20. In combination a frame, a carriage movable in the frame, selector strips mounted in the carriage and being adjustable from inoperative position into operative position, stops for holding the strips in adjusted position, a plurality of files with recesses arranged in a predetermined manner in their edges, each file edge also having a hook-shaped notch, the strips when brought into engagement with the file edges entering those files having recesses corresponding with the selector strips in operative position, whereby certain files can be moved with respect to the other files, and a hook-shaped member carried by the selector and designed to enter the hook-shaped notches of the files already selected, whereby the selected files may be entirely removed from the files when the carriage is withdrawn.

ROBERT O. GRIFFIN.